G. CUGLEY.
THERMOSTAT.
APPLICATION FILED JULY 19, 1913.
1,111,138.
Patented Sept. 22, 1914.
2 SHEETS—SHEET 1.
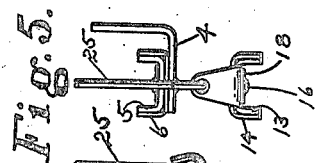
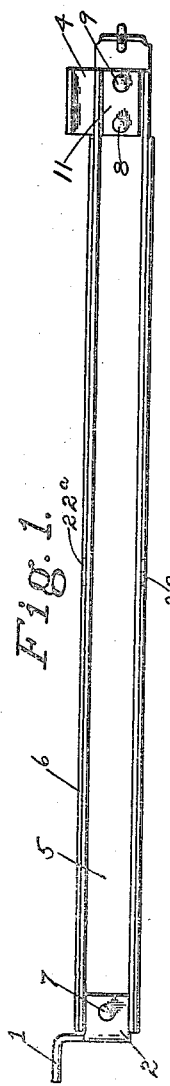
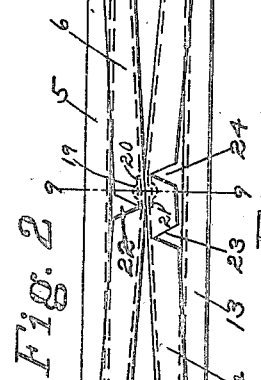
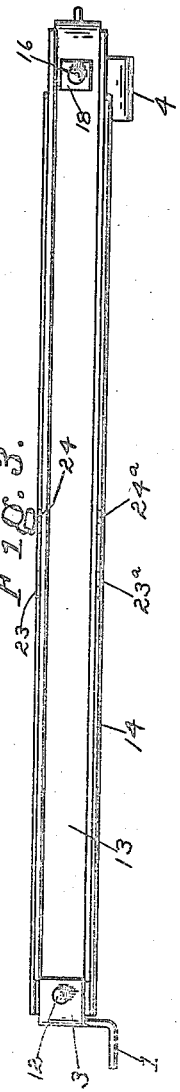
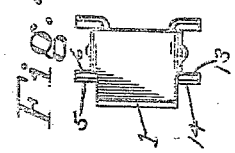
Witnesses
Esther Pfeifer
Inventor
George Cugley
By
Attorneys

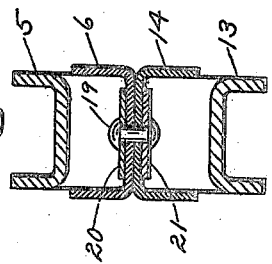
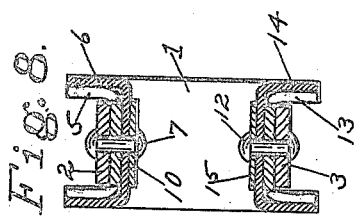
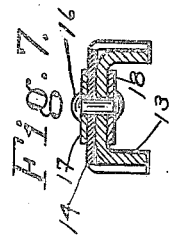
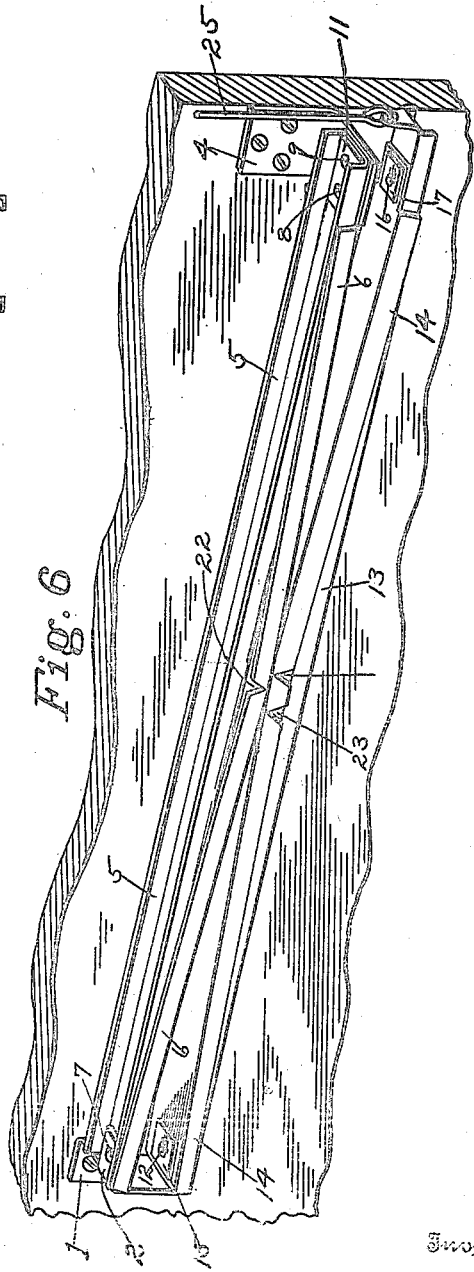

UNITED STATES PATENT OFFICE.

GEORGE CUGLEY, OF SPRINGFIELD, OHIO, ASSIGNOR TO THE BUCKEYE INCUBATOR COMPANY, OF SPRINGFIELD, OHIO, A CORPORATION OF OHIO.

THERMOSTAT.

1,111,138.     Specification of Letters Patent.     Patented Sept. 22, 1914.

Application filed July 19, 1913. Serial No. 779,960.

*To all whom it may concern:*

Be it known that I, GEORGE CUGLEY, a citizen of the United States, residing at Springfield, in the county of Clark and State of Ohio, have invented certain new and useful Improvements in Thermostats, of which the following is a specification.

This invention relates to improvements in that class of thermostats which are more especially adapted for regulating the heat of incubators and brooders; particularly that type of thermostats which are constructed of a series of nested channels constructed of two metals of different degrees of expansion and contraction.

The object of my invention is to so construct and arrange these channels as to secure the maximum movement by the expansion and contraction thereof in the minimum amount of space to a greater degree than has been heretofore accomplished.

A further object of my invention is to simplify and make more effective the operation of devices of this character.

In the accompanying drawings,—Figure 1 is a top plan view of a device embodying my improvements. Fig. 2 is an elevation of the front side thereof. Fig. 3 is a bottom plan. Fig. 4 is a view of one of the ends. Fig. 5 is a view of the opposite end. Fig. 6 is a perspective view showing the device attached to a portion of the wall of the incubator. Fig. 7 is an enlarged section on the line 7—7 of Fig. 2. Fig. 8 is an enlarged section on the line 8—8 of Fig. 2. Fig. 9 is an enlarged sectional view on the line 9—9 of Fig. 2.

Like parts are represented by similar characters of reference throughout the several views.

In the said drawings, 1 represents an L-shaped bracket which may be secured in any suitable manner to the wall of the incubator or other structure in connection with which the device is to be used; this bracket having upper and lower laterally-extending ears 2 and 3. 4 represents another L-shaped bracket which is also secured in any suitable manner to the wall of the incubator.

Secured to the ear 2 of the bracket 1 and also to the laterally-projecting portion of the bracket 4, by rivets 7, 8 and 9, are two nested channels 5 and 6; a washer 10 being preferably inserted between the under side of the channel 6 and the head of the rivet, and a washer 11 being inserted between the upper side of the channel 5 and the heads of the rivets 8 and 9. Secured to the ear 3 of the bracket 1 by a rivet 12 are two other nested channels 13 and 14; a washer 15 being inserted between the channel 14 and the head of the rivet. The opposite ends of these channels 13 and 14 are connected by a rivet 16; washers 17 and 18 being inserted between the respective channels and the heads of the rivets. The upper and lower channels 5 and 13 are constructed of metal with the minimum power of expansion and contraction, such as iron, while the intermediate channels 6 and 14 are constructed of metal with the maximum amount of expansion and contraction, such as zinc. The channels 6 and 14 are bowed, placed back to back, and connected together near their central portions by a rivet 19, washers 20 and 21 being inserted between the respective channels and the respective heads of the rivet.

The sides of the upper channel 5 are continuous throughout their entire length. At the end of the channel 6 where it is connected with the bracket 4, the side walls thereof are cut away, the cut away portion terminating at a point coincident with the edge of the bracket. The side walls of the channel 14 at that end where it is secured solely to the channel 13 are also cut away as shown; the cut away portions terminating substantially at the inside edges of the washers 17 and 18. The side walls of the lower channel 13 at that end where the channel is connected to the bracket 1 are cut away as shown in Fig. 3, the cut away portions terminating at a point coincident with the edge of the ear 3.

The side walls of the channel 6 at points midway their length are provided with V-shaped notches 22 and 22$^a$. The side walls of the channel 14 are provided with V-shaped notches 23, 23$^a$, 24 and 24$^a$. The notches are so arranged that the ones 22 and 22$^a$ will be between the ones 23 and 24, 23$^a$ and 24$^a$. The two channels 6 and 14 are also connected together by the rivet 19 at a point between the respective notches 22 and 22$^a$ and 24 and 24$^a$, with the respective sides of the washers 20 and 21 coinciding with the apexes of the respective notches, as shown best in dotted lines in Fig. 2.

The result of this construction is that as the inner channels 6 and 14 expand and contract, the free end of the channel 13 will be moved up and down, this free end being connected by a rod 25 with any suitable regulating device. The cut away portions of the respective channels permits of this movement of the parts by forming in effect hinges for the channels, and the respective notches in the side walls of the channels also permit the said channels to buckle up under expansion. By reason of having the two notches in the channel 14 placed on each side of the single notch in the channel 16, it has been found that a greater movement can be secured in a device of this character which occupies no more space than prior devices, so that a maximum amount of movement of the parts is secured in the minimum amount of space.

Having thus described my invention, I claim:

1. In a thermostat, a series of four channel-shaped members, the intermediate members being more expansible than the outer members and being arranged back to back and connected together at or near their centers, one of said intermediate members having a pair of notches cut in each of its side walls, and the other of said intermediate members having a single notch cut in each of its side walls intermediate the notches of the other members.

2. In a thermostat, four channel-shaped members arranged in pairs, the ends of the members of each pair being connected together, the intermediate members being placed back to back and connected together near their centers, one of said intermediate members having each of its side walls formed with a pair of notches and the other intermediate member having its side walls formed with a single notch arranged intermediate the notches of the other member, the point of connection between said intermediate members being arranged between the single notch and one of the double notches.

3. In a thermostat, a series of four channel-shaped members arranged in pairs, the intermediate members being of more expansible material than the other members, said intermediate members being oppositely bowed, placed back to back and connected together, one of said intermediate members having each of its side walls formed with a pair of notches and the other of said intermediate members having each of its side walls formed with a single notch intermediate the notches of the other member.

4. In a thermostat, a series of four channel-shaped members arranged in pairs, the ends of the channels of each pair being connected together, the intermediate members being oppositely bowed and placed back to back so as to separate the ends of the members of each pair, each pair of members being connected at one end to a bracket to hold them permanently spaced apart, the opposite ends of the one of said pair of members being also connected to a second bracket and the opposite ends of the other pair of members being left free, the side walls of one of said intermediate members being formed with a pair of notches and the side walls of the other intermediate member being formed with a single notch intermediate the notches of the other member, and means for connecting said intermediate members together at or near their centers between the single notch and one of the double notches.

5. In a thermostat, a series of four metallic channel-shaped members arranged in two pairs, an upper pair and a lower pair; the intermediate members being of more expansible material than the other members and being oppositely bowed and placed back to back, a bracket to which one end of all of said members are connected, a second bracket to which the opposite ends of the upper pair of members are connected, the opposite ends of the other pair being connected to each other, and being otherwise free; the side walls of the bowed member of the upper pair being cut away at the point of connection with said last-mentioned bracket; the side walls of the lower member being cut away at the point of connection with said first-mentioned bracket; the side walls of the lower bowed member being cut away at the point of connection with said lower member; the lower bowed member being formed with a pair of notches and the upper bowed member formed with a single notch arranged intermediate the notches of the lower bowed member; and means for connecting said bowed members together.

In testimony whereof, I have hereunto set my hand this 3rd day of July 1913.

GEORGE CUGLEY.

Witnesses:
CHAS. I. WELCH,
ESTHER E. PFEIFER.